United States Patent
Hsu et al.

(10) Patent No.: US 9,041,763 B2
(45) Date of Patent: May 26, 2015

(54) METHOD FOR ESTABLISHING VIDEO CONFERENCE

(71) Applicant: Quanta Computer Inc., Kuei Shan Hsiang, Tao Yuan Shien (TW)

(72) Inventors: Hsueh-Cheng Hsu, Tao Yuan Shien (TW); Tsai-Mu Chen, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 91 days.

(21) Appl. No.: 13/912,878

(22) Filed: Jun. 7, 2013

(65) Prior Publication Data

US 2014/0240446 A1    Aug. 28, 2014

(30) Foreign Application Priority Data

Feb. 22, 2013    (TW) .............................. 102106131 A (51) Int. Cl.
| | |
|---|---|
| H04N 7/14 | (2006.01) |
| H04N 7/15 | (2006.01) |
| H04M 3/56 | (2006.01) |
| H04M 7/00 | (2006.01) |
| H04L 29/06 | (2006.01) |
| H04L 12/18 | (2006.01) |

(52) U.S. Cl.
CPC .............. *H04N 7/152* (2013.01); *H04M 3/567* (2013.01); *H04M 7/0024* (2013.01); *H04M 2201/50* (2013.01); *H04L 65/4038* (2013.01); *H04L 12/1822* (2013.01)

(58) Field of Classification Search
CPC .... H04N 7/152; H04M 3/567; H04M 7/0024; H04M 2201/50; H04L 65/4038

USPC ................................ 348/14.01–14.9; 709/204
See application file for complete search history.

(56) References Cited

U.S. PATENT DOCUMENTS

| | | | | |
|---|---|---|---|---|
| 6,011,579 | A * | 1/2000 | Newlin ...................... | 348/14.08 |
| 7,218,338 | B2 * | 5/2007 | McKnight et al. .......... | 348/14.09 |
| 7,835,764 | B2 * | 11/2010 | Kanada ....................... | 455/550.1 |
| 8,102,984 | B2 * | 1/2012 | Rodman et al. ............ | 379/202.01 |
| 8,144,854 | B2 * | 3/2012 | Rodman ..................... | 379/202.01 |
| 8,223,942 | B2 * | 7/2012 | Rodman et al. ............ | 379/202.01 |
| 8,558,864 | B1 * | 10/2013 | Koller et al. ................ | 348/14.01 |
| 8,582,565 | B1 * | 11/2013 | Morsy et al. ................. | 370/352 |
| 8,705,719 | B2 * | 4/2014 | Rodman et al. ............ | 379/202.01 |
| 2002/0083462 | A1 * | 6/2002 | Arnott ............................ | 725/100 |
| 2007/0291736 | A1 * | 12/2007 | Furlong et al. ................ | 370/352 |
| 2009/0028300 | A1 * | 1/2009 | McLaughlin .................. | 379/52 |
| 2009/0164645 | A1 * | 6/2009 | Sylvain .......................... | 709/228 |

(Continued)

*Primary Examiner* — Maria El-Zoobi
*Assistant Examiner* — Julie X Dang
(74) *Attorney, Agent, or Firm* — McClure, Qualey & Rodack, LLP (57) ABSTRACT

A method for establishing a video conference is provided. The method is applied in a video conferencing system. The system has a first electronic device, a second electronic device, a third electronic device, a fourth electronic device, and a server. The first and second electronic devices are associated with a first user. The third and fourth electronic devices are associated with a second user. The method is capable of building an audio communication between the first electronic device and the third electronic device over a telecommunications network; and building a video communication between the second electronic device and the fourth electronic device over an IP network simultaneously, wherein the video communication is parallel to the audio communication.

24 Claims, 7 Drawing Sheets

(56) References Cited

U.S. PATENT DOCUMENTS

| | | | |
|---|---|---|---|
| 2009/0291677 A1* | 11/2009 | Lauby et al. | 455/418 |
| 2009/0293091 A1* | 11/2009 | Shum et al. | 725/87 |
| 2010/0066805 A1* | 3/2010 | Tucker et al. | 348/14.08 |
| 2010/0235894 A1* | 9/2010 | Allen et al. | 726/7 |
| 2011/0145361 A1* | 6/2011 | Shum et al. | 709/217 |
| 2011/0181683 A1* | 7/2011 | Nam | 348/14.07 |
| 2011/0249073 A1* | 10/2011 | Cranfill et al. | 348/14.02 |
| 2012/0019609 A1* | 1/2012 | Chang et al. | 348/14.01 |
| 2012/0029303 A1* | 2/2012 | Shaya | 600/300 |
| 2012/0092438 A1* | 4/2012 | Guzman Suarez et al. | 348/14.03 |
| 2012/0140017 A1* | 6/2012 | Hong et al. | 348/14.1 |
| 2012/0190336 A1* | 7/2012 | Nakao | 455/411 |
| 2012/0242776 A1* | 9/2012 | Tucker et al. | 348/14.03 |
| 2012/0260232 A1* | 10/2012 | Hirsch et al. | 717/107 |
| 2013/0023306 A1* | 1/2013 | Somei | 455/556.1 |
| 2013/0027508 A1* | 1/2013 | Charish et al. | 348/14.08 |
| 2013/0038675 A1* | 2/2013 | Malik | 348/14.08 |
| 2013/0088564 A1* | 4/2013 | Hillier et al. | 348/14.08 |
| 2013/0147900 A1* | 6/2013 | Weiser et al. | 348/14.08 |
| 2013/0147906 A1* | 6/2013 | Weiser et al. | 348/14.09 |
| 2013/0155169 A1* | 6/2013 | Hoover et al. | 348/14.02 |
| 2013/0162753 A1* | 6/2013 | Hendrickson et al. | 348/14.08 |
| 2013/0201155 A1* | 8/2013 | Wu et al. | 345/174 |
| 2013/0265378 A1* | 10/2013 | Abuan et al. | 348/14.02 |
| 2013/0342637 A1* | 12/2013 | Felkai et al. | 348/14.08 |
| 2014/0012677 A1* | 1/2014 | Wagner | 705/14.64 |
| 2014/0104369 A1* | 4/2014 | Calman et al. | 348/14.08 |
| 2014/0139609 A1* | 5/2014 | Lu et al. | 348/14.03 |

* cited by examiner

METHOD FOR ESTABLISHING VIDEO CONFERENCE

CROSS REFERENCE TO RELATED APPLICATIONS

This Application claims priority of Taiwan Patent Application No. 102106131, filed on Feb. 22, 2013, the entirety of which is incorporated by reference herein.

BACKGROUND OF THE INVENTION

1. Field of the Invention

The present invention relates a communication system, and in particular to a video conferencing system and method for establishing a video conference capable of utilizing a telecommunications network and an IP network simultaneously.

2. Description of the Related Art

In a conventional video communication device or a conventional video conferencing system, audio and video data are transmitted over the same telecommunications network (e.g. 3G or 4G network), the IP network, or the Internet. However, the cost for performing a video call over the telecommunications network is very high. Although the data transmission speed of the Internet or the IP network is faster, the communication quality of the Internet or the IP network is worse than that of the telecommunications network. In other words, the conventional video communication device or video conferencing system on the market cannot achieve both excellent audio and video communication quality by utilizing the advantages of the telecommunications network and the Internet effectively without avoiding the disadvantages of the telecommunications network and the Internet.

BRIEF SUMMARY OF THE INVENTION

A detailed description is given in the following embodiments with reference to the accompanying drawings.

In an exemplary embodiment, a method for establishing a video conference for use in a video conferencing system is provided. The video conferencing system comprises a first electronic device, a second electronic device, a third electronic device, a fourth electronic device, and a server. The first electronic device corresponds to a first user and a first telephone number and is connected to a telecommunications network and an IP network. The third electronic device corresponds to a second user and a second telephone number and is connected to the telecommunications network. The second electronic device corresponds to the first user and a first video network account and is connected to the IP network. The fourth electronic device corresponds to the second user and a second video network account and is connected to the IP network. The server is connected to the IP network. The method comprises the steps of: (a) executing a communication monitoring program via the first electronic device; (b) dialing the third electronic device corresponding to the second telephone number over the telecommunications network and building a first audio call between the first electronic device and the third electronic device over the telecommunications network via the first electronic device; (c) reporting the first audio call to the server over the IP network by the communication monitoring program when the communication monitoring program detects that the first electronic device is dialing the third electronic device or that the first audio call has been built, so that the server transmits a video transmission request to the second electronic device and/or the fourth electronic device; and (d) building video transmission between the second electronic device and the fourth electronic device over the IP network when the video transmission request has been received by the second electronic device and/or the fourth electronic device, wherein the video transmission is parallel to the first audio call.

In another exemplary embodiment, a method for establishing a video conference for use in a video conferencing system is provided. The video conferencing system comprises a first electronic device, a second electronic device, a third electronic device, a fourth electronic device, and a server. The first electronic device corresponds to a first user and a first telephone number and is connected to a telecommunications network and an IP network. The third electronic device corresponds to a second user and a second telephone number and is connected to the telecommunications network. The second electronic device corresponds to the first user and a first video network account and is connected to the IP network. The fourth electronic device corresponds to the second user and a second video network account and is connected to the IP network. The server is connected to the IP network. The method comprises the following steps of: (a) executing a communication monitoring program via the third electronic device; (b) reporting an audio call to the server over the IP network via the communication monitoring program when the second user uses the third electronic device to answer an audio call request for building the audio call from the first electronic device, so that the server transmits a video transmission request to the second electronic device and the fourth electronic device; and (c) building video transmission between the second electronic device and the fourth electronic device over the IP network when the video transmission request has been received by the second electronic device and/or the fourth electronic device, wherein the video transmission is parallel to the audio call.

In yet another exemplary embodiment, a method for establishing a video conference for use in a video conferencing system is provided. The video conferencing system comprises a first electronic device, a second electronic device, a third electronic device, a fourth electronic device, and a server. The first electronic device corresponds to a first user and a first telephone number and is connected to a telecommunications network and an IP network. The third electronic device corresponds to a second user and a second telephone number and is connected to the telecommunications network. The second electronic device corresponds to the first user and a first video network account and is connected to the IP network. The fourth electronic device corresponds to the second user and a second video network account and is connected to the IP network. The server is connected to the IP network. The method comprises the steps of: (a) executing a communication monitoring program via the third electronic device; and (b) when the first user utilizes the first electronic device and/or the second electronic device to transmit a video transmission request to the third electronic device and/or the fourth electronic device over the IP network, answering the video transmission request by using the communication monitoring program executed by the third electronic device of the second user.

In yet another exemplary embodiment, a method for establishing a video conference for use in a video conferencing system is provided. The video conferencing system comprises a first electronic device, a second electronic device, a third electronic device, a fourth electronic device, and a server. The first electronic device corresponds to a first user and a first telephone number and is connected to a telecommunications network and an IP network. The third electronic device corresponds to a second user and a second telephone number and is connected to the telecommunications network. The second electronic device corresponds to the first user and a first video network account and is connected to the IP network. The fourth electronic device corresponds to the second user and a second video network account and is connected to the IP network. The server is connected to the IP network. The method comprises the following steps: (a) executing a communication monitoring program via the first electronic device; (b) building a video call between the second electronic device and the fourth electronic device over the IP network; (c) when the first user utilizes a user interface of the second electronic device to initiate an audio call, reporting the initiation event to the server over the IP network via the communication monitoring program, so that the server transmits an audio call request to the first electronic device, thereby the first electronic device dials the third electronic device corresponding to the second telephone number; and (d) building the audio call between the first electronic device and the third electronic device over the telecommunications network when the dialing event from the first electronic device is received by the third electronic device, wherein the audio call is parallel to the video call.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
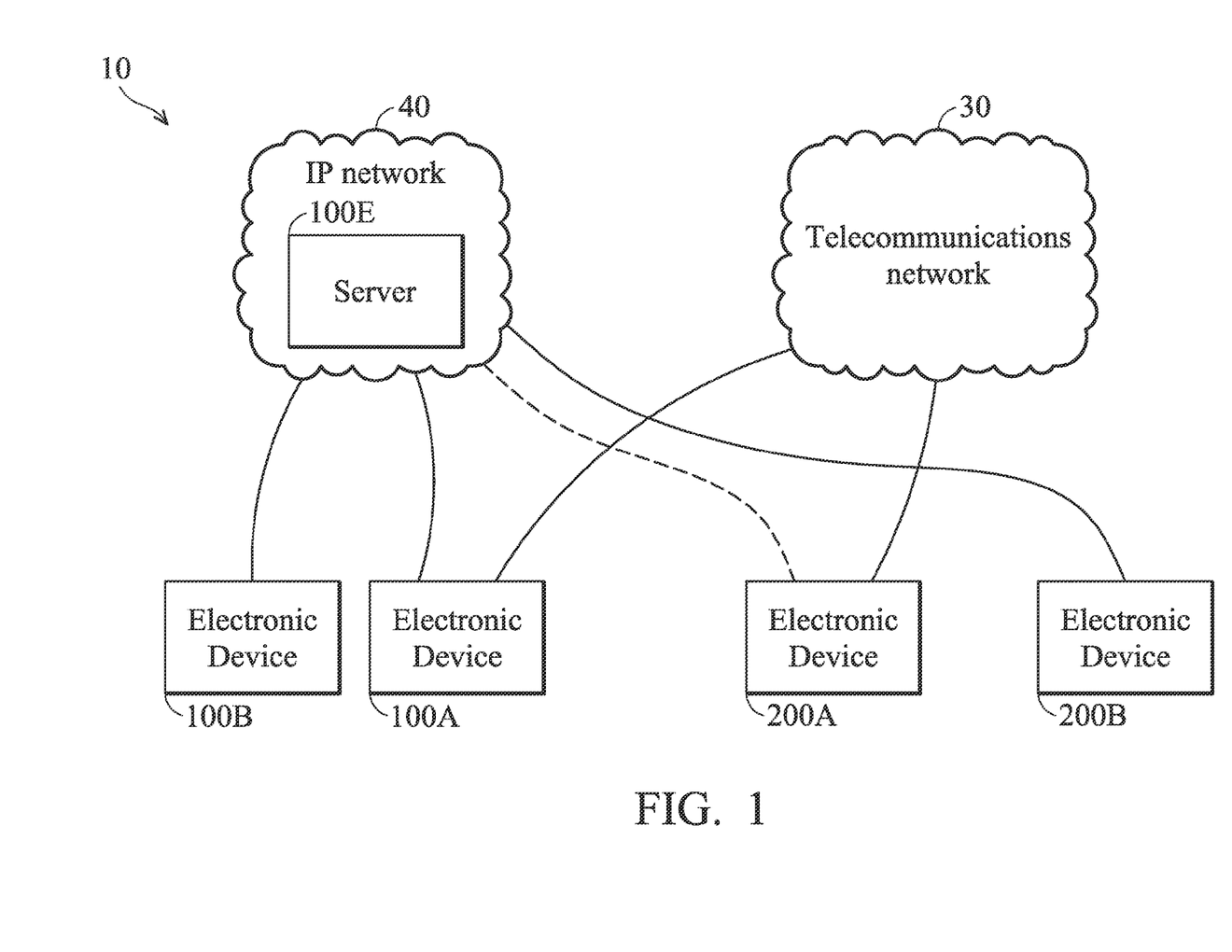
FIG. 1 is a diagram illustrating a video conferencing system 10 according to an embodiment of the invention.

FIG. 1 is a diagram illustrating a video conferencing system 10 according to an embodiment of the invention. The video conferencing system 10 may comprise an electronic device 100A, an electronic device 100B, an electronic device 200A, an electronic device 200B, and a server 100E. For example, the electronic devices 100A and 100B may connect to each other via an IP network, a local network or a wireless network (e.g. Wifi), and the electronic devices 200A and 200B may connect to each other via another IP network or wireless network (e.g. Wifi). In addition, the electronic devices 100A and 200A may connect to the server 100E in an IP network 40 via a telecommunications network 30. In an embodiment, the electronic devices 100 and 200A may be a smartphone capable of connecting to a telecommunications network for communication. Alternatively, the electronic device 200A may be a conventional PSTN telephone or a 2G/3G cellular phone capable of connecting to a telecommunications network for communication. The electronic devices 100B and 200B may be a tablet PC, a laptop, a personal computer, or a video conferencing device (e.g. a set-top box with a TV), and the server 100E may be a personal computer or a cloud server (e.g. supporting the sessions initiation protocol (SIP), and being a remote management system (RMS) for managing incoming/out-going calls), but the invention is not limited thereto.

In the embodiment, a user A may operate the electronic devices 100A and 100B, and a user B may operate the electronic devices 200A and 200B. For example, the electronic device 100A and 100B may have a respective telephone number, such as 1236666666 and 1234567890. The electronic devices 100B and 200B may have a respective network identity account, such as Calvin1 and John1. In addition, the electronic devices 100A-100B and 200A-200B can be regarded as clients relative to the server 100E.

Figure 2:
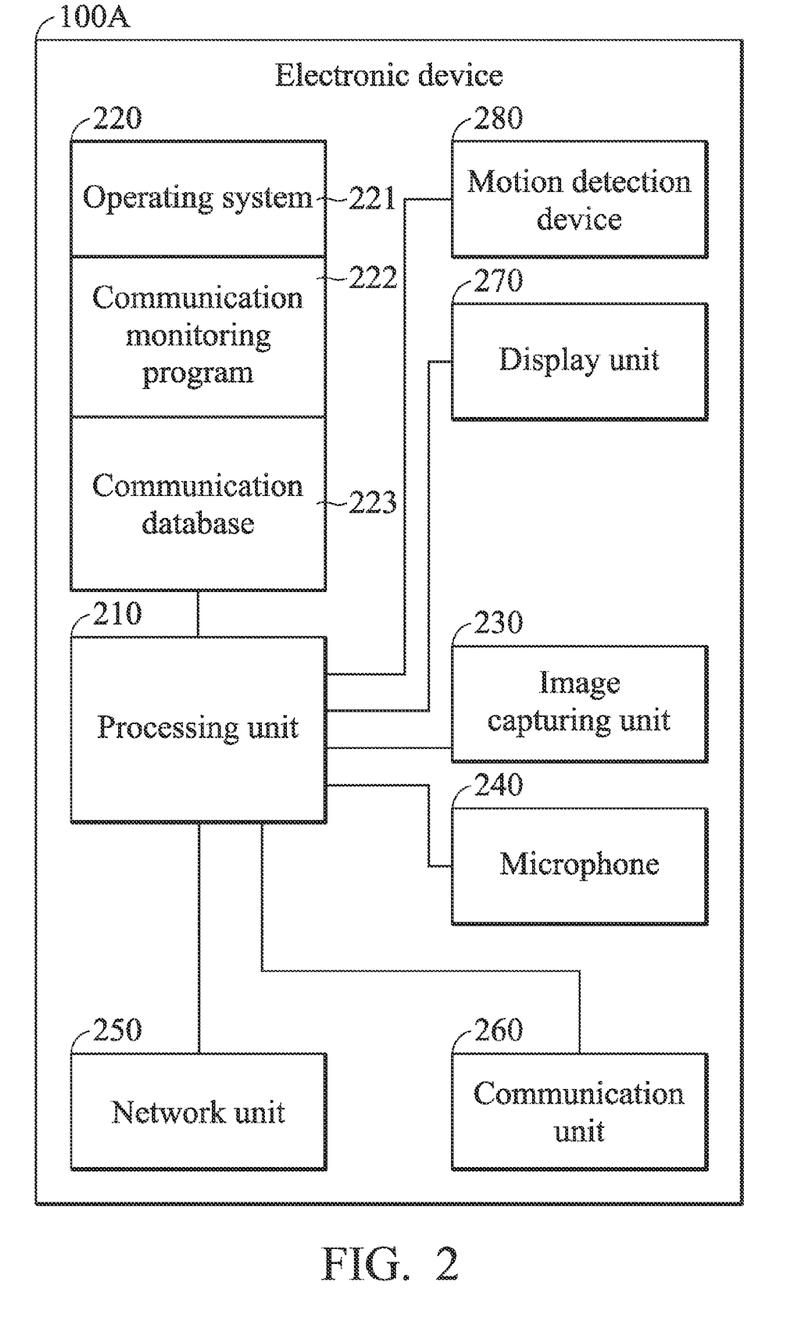
FIG. 2 is a schematic diagram illustrating the electronic device 100A according to an embodiment of the invention.

FIG. 2 is a schematic diagram illustrating the electronic device 100A according to an embodiment of the invention. The electronic device 100A may comprise a processing unit 210, a storage unit 220, an image capturing unit 230, a microphone 240, a network unit 250, a communication unit 260, a display unit, and a motion detection device 280. For example, the electronic device 100A may connect to a local network or a wireless network (e.g. Wifi, Bluetooth, or a 2G/3G/LTE telecommunications IP network) via the network unit 250, and the electronic device 100A may further connect to the server 20 over the IP network 40 via the network unit 250. In addition, the electronic device 100A may further connect to the telecommunications network 30 (e.g. 2G/3G/CDMA/LTE telecommunications network) via the communication unit 260. In an embodiment, the storage unit 220 may comprise an operating system 221, a communication monitoring program 222, and a communication database 223, wherein the operating system 221 may be a Windows operating system, a Linux operating system, or an iOS operating system, but the invention is not limited thereto. The communication monitoring program 222 is configured to provide and control (e.g. monitoring) activities of the network unit 250 and the communication unit 260 of the electronic device 100A, and perform subsequent corresponding operations according to different activities taking place in the network unit 250 and the communication unit 260. The details will be described later. The communication database 223 may record a user address book (e.g. comprising telephone numbers and corresponding IP video network accounts of users A and B) and device binding data (e.g. other electronic devices, such as the electronic device 100B or other devices, bound with the electronic device 100A). The processing unit 210 may execute the operating system 221 as an operating platform, and execute the communication monitoring program 222 to monitor the activities of the network unit 250 and the communication unit 260 of the electronic device 100A. Then, the processing unit 210 may perform subsequent corresponding operations according to different activities taking place in the network unit 250 and the communication unit 260. The motion detection device 280 may comprise detection devices, such as an accelerometer and a gyroscope, for detecting the motion (e.g. acceleration and angular speed of the electronic device 100A) of the electronic device 100A, but the invention is not limited thereto.

Specifically, when performing a video call or a video conference, the processing unit 210 may direct the image capturing unit 230 and the microphone 240 to turn on or off, awaken bound electronic devices (e.g. the electronic device 100B), and control the transmissions of audio signals and video signals in the corresponding networks according to different communication configurations. For example, when performing a video call or a video conference, the user A may utilize the electronic device 100A (e.g. a smartphone) to transmit audio signals to the electronic device 200A of the user B via the telecommunications network 30, and utilize the electronic device 100B (e.g. a tablet PC) to transmit packets of corresponding video signals to the electronic device 200B of the user B through the server 100E over the IP network 40. Then, the electronic device 200B may restore (e.g. de-modulation) the received packets to obtain the corresponding video signal from the electronic device 100B. It should be noted that, in some embodiments, the electronic devices 100B, 200A and 200B may have similar components as those in the electronic device 100A. Also, the electronic devices 100A~100B and 200A~200B can be regarded as clients relative to the server 100E. In some other embodiments, the electronic devices 100B and 200B do not comprise a corresponding communication unit for connecting to a telecommunications network. In yet other embodiments, the electronic device 200A may be a conventional home telephone (e.g. a PSTN telephone) as a called party.

In an embodiment, the communication monitoring program 222 not only controls the activities of the network unit 250 and the communication unit 260 of the electronic device 100A, but also reports (e.g. via the HTTP protocol) all communication events to the server 100E. For example, the reported communication events may be a calling-party initiating a new call, a called party receiving an incoming call, a called party responding to a call, and a calling-party hanging up a call, but the invention is not limited thereto. In addition, the communication monitoring program 222 may further display notification messages on the display unit corresponding to each electronic device, wherein the notification messages may be messages, such as the user's telephone number, the telephone number of the called party, being a calling-party or a called party, types of calling events, or GPS coordinates, but the invention is not limited thereto.

In an embodiment, the communication monitoring program 222 executed by the processing unit 210 of the electronic device 100A may determine which corresponding electronic devices to be triggered in a video call according to the user address book (e.g. comprising telephone numbers and corresponding IP video network accounts of users A and B) and the device binding data (e.g. other electronic devices, such as the electronic device 100B or other devices, bound with the electronic device 100A) stored in the communication database 223. The electronic device 200A can be triggered in a similar way to that of the electronic device 100A. For example, the telephone number of the electronic device 100A of the user A is 1236666666, and the video network account of the user A is Calvin1, and the user A may utilize the electronic device 100 to log in to the server 100E with the video network account Calvin1. The telephone number of the electronic device 200A of the user B is 1234567890, and the video network account of the user B is John1, and the user B may utilize the electronic device 200B to log in to the server 100E with the video network account John1. When the user A dials up the telephone number 1234567890 of the user B via the electronic device 100A, the communication monitoring program 222 executed on the electronic device 100A may inform the server 100E of the communication activities executed on the electronic device 100A. Meanwhile, the user B may answer the audio call from the user A via the electronic device 200A, and the server 100E may inform the electronic devices 100B and 200B of the responded call, thereby activating the image capturing units of the electronic devices 100B and 200B, respectively. Specifically, the users A and B may build an audio call connection to each other via the electronic devices 100A and 200A, and exchange respective video screens captured by the electronic devices 100B and 200B. In the embodiment, the user A may select the IP network 40 or the telecommunications network 30 freely through which the user A dials the telephone number of the user B via the electronic device 100A, and the user B may select the IP network 40 or the telecommunications network 30 freely through which the user B answers the call. If the electronic device 200A is a common home telephone, the user B may only answer the call over the telecommunications network 30. In other words, the communication between the users A and B may be a type of network telephone call, such as "PC to PC", "PC to Phone", or "Phone to Phone". For those skilled in the art, it is appreciated that a network telephone call can be implemented in different ways, and the details will not be described here. Generally, if an audio call is initiated over a telecommunications network, communication quality of the audio call is better and the connection of the audio call is more stable.

In addition, in another embodiment, the server 100E may also comprise a communication database (not shown in FIG. 1), and the communication monitoring program 222 executed by the processing unit 210 of the electronic device 100A may use the user address book (e.g. comprising telephone numbers and corresponding IP video network accounts of users A and B) and the device binding data (e.g. other electronic devices, such as the electronic device 100B or other devices, bound with the electronic device 100A), thereby determining which electronic device to trigger during the video call. In the embodiment, the content in the communication databases of the electronic devices 100A and 200A can be synchronized with that in the communication database of the server 100E. In other words, the electronic device 100A may retrieve the latest user address book and the device binding data thereof from the server 100E periodically/aperiodically and automatically/manually, thereby updating the communication database 223. Accordingly, the communication monitoring program 222 may trigger other corresponding electronic devices for a video call through the server 100E according to the user address book and the device binding data thereof stored in the communication database 223.

Figure 3A:
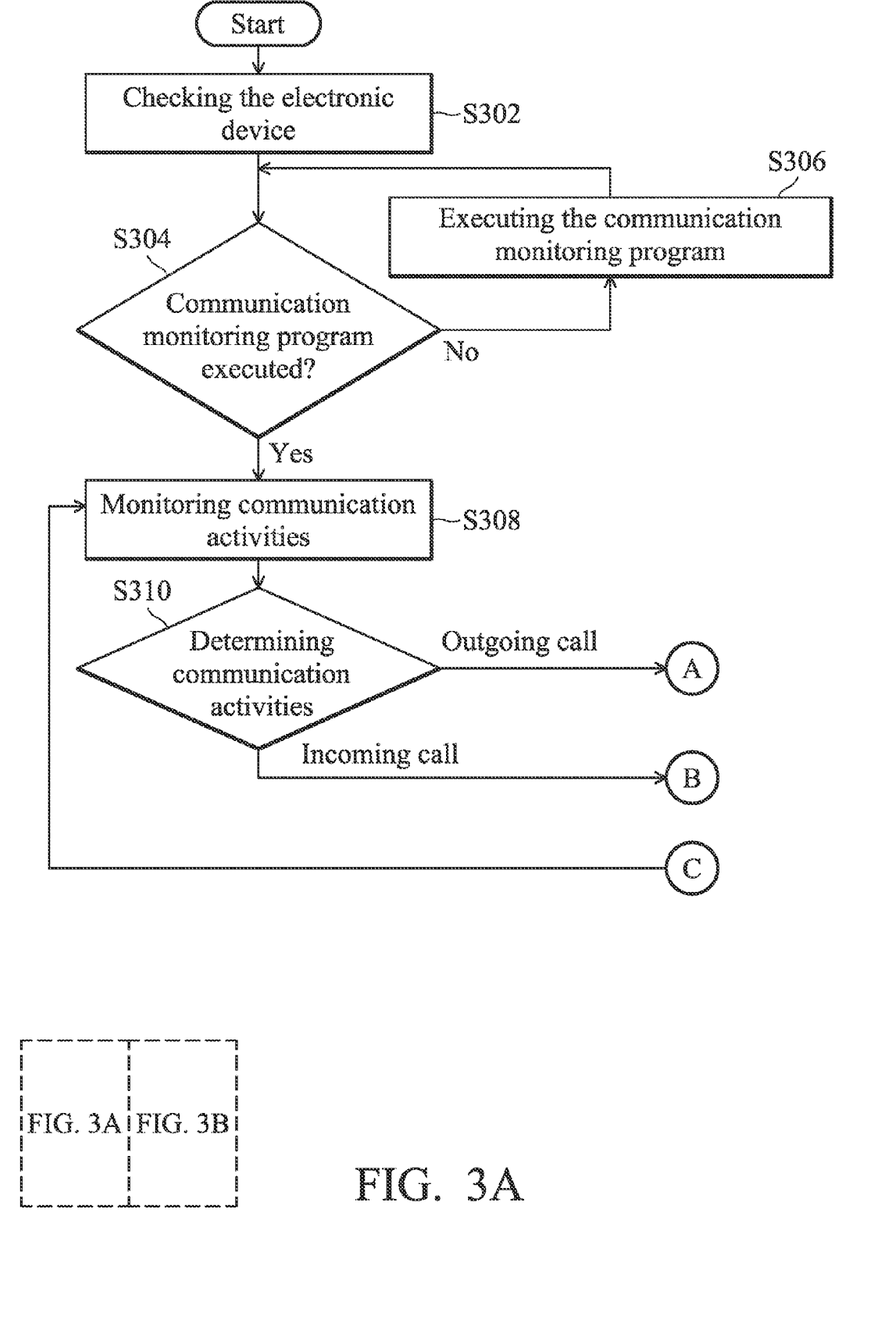
FIGS. 3A and 3B are portions of a flow chart illustrating the operations of the communication monitoring program according to an embodiment of the invention.
Figure 3B:
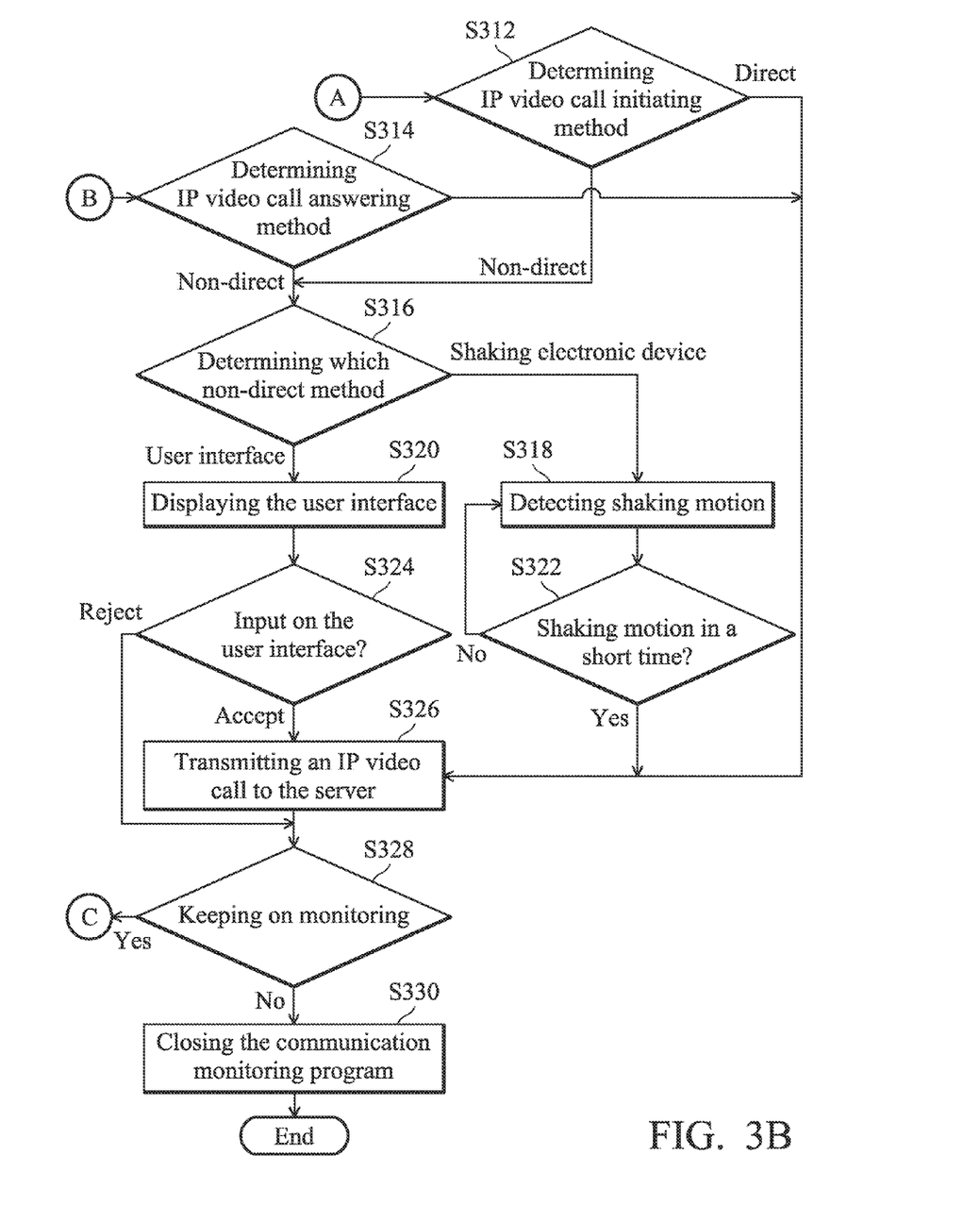

FIGS. 3A and 3B are portions of a flow chart illustrating the operations of the communication monitoring program according to an embodiment of the invention. In step S302, the processing unit 210 may check the settings of the electronic device 100A. Briefly, in step 304, the processing unit 210 may further determine whether the communication monitoring program 222 is executed. If so, step S308 is performed. If not, the processing unit 210 may execute the communication monitoring program 222 (step S306). That is, the subsequent steps are performed by the communication monitoring program 222. In step S308, the communication monitoring program 222 may monitor the call activities of the electronic device 100A. In step S310, the communication monitoring program 222 may determine the types of call events on the electronic device 100A. If an outgoing call is obtained, step S312 is performed. If an incoming call is obtained, step S314 is performed.

In step S314, the communication monitoring program 222 may further determine the method for initiating an IP video call. If the IP video call is initiated by using a direct method, step S326 is performed. If the IP video call is initiated by using a non-direct method, step S316 is performed. In step S316, the communication monitoring program 222 may further determine the type of the non-direct method. If a method of shaking the electronic device is used, step S318 is performed. If a user interface is used, step S320 is performed. In step S318, the communication monitoring program 222 may consistently monitor the shaking motions of the electronic device 100. For example, the processing unit 210 may receive the motion information (e.g. acceleration and angular speed) from the motion detection device 280 (comprising an accelerometer and a gyroscope) of the electronic device 100A, thereby determining the shaking motions of the electronic device 100A. Then, in step S322, the communication monitoring program 222 may determine whether the electronic device 100A is repeatedly shaken in a predetermined time period (e.g. being shaken up and down, or left and right 3 times within a short time (e.g. 2 seconds)). If so, step S326 is performed. If not, step S318 is performed for consistently detecting the shaking motion of the electronic device 100A.

In step S320, the communication monitoring program 222 may display a user interface comprising options for being selected by the user to initiate a video call or reject a video call. In step S324, the communication monitoring program 222 may further determine the option inputted by the user on the user interface. If the option "initiating a video call" is selected, step S326 is performed. If the option "rejecting a video call" is selected, step S328 is performed. In step S328, the communication monitoring program 222 may determine whether to continue monitoring the communication activities of the electronic device 100A. If so, step S308 is performed. If not, step S330 is performed to close the communication monitoring program 222.

In the aforementioned embodiment, the procedure for performing an audio call or a video call by the video conferencing system 10 is described with an example that a video network account is bound to a telephone number. In another embodiment, if the user A has some other electronic devices capable of performing a video call, the user A may log in to the server 100E by all electronic devices of the user A with the same video network account Calvin1. Accordingly, the server 100E may update the user address book and the device binding data thereof in the communication database according to the logon information of the user A. Similarly, the user B may also log in to the server 100E with all electronic devices of the user B (comprising the electronic devices 200A-200B and other electronic devices) with the same video network account John1. Therefore, the electronic devices 100A, 100B, 200A and 200B may retrieve the updated user address book and the device binding data thereof from the server 100E.

In yet another embodiment, the user A may still have some other electronic devices for performing a video call. The user A may log in to the server 100E by all electronic devices of the user A with different video network accounts, such as Calvin1, Calvin2, and Calvin3, etc. In addition, the user A may bind the video network accounts Calvin1, Calvin2, and Calvin3 to the telephone number 1236666666 of the user A on the server 100E in advance. Accordingly, the server 100E may update the user address book and the device binding data thereof in the communication database according to the logon information of the user A. Similarly, the user B may also log in to the server 100E by all electronic devices of the user B with different video network accounts, such as John1, John2, John3, etc. In addition, the user B may also bind the video network accounts John1, John2 and John3 to the telephone number 1234567890 of the user B on the server 100E in advance. The server 100E may update the user address book and the device binding data thereof in the communication database according to the logon information of the user B. Then, the users A and B may select the electronic devices to be used for performing audio/video transmission, respectively. It should be noted that reference can be made in the aforementioned embodiment for the subsequent operations after dialing a video call, and the details will not be described here. The procedures for performing a video call over a telecommunications network and/or an IP network by the video conferencing system 10 of the invention, and for binding one or more video network accounts to a specific telephone number for performing a video call are described in the aforementioned embodiments. In the following embodiments, the procedures for answering an audio call and request of video transmission by different electronic devices and for hanging-up a video call are described.

In an embodiment, if an audio call and the corresponding video call are not initiated simultaneously, the subsequent operations will be performed by the video conferencing system 10 of the invention. For example, the server 100E may execute a trigger management application for handling requests of audio calls or video transmission from difference electronic devices. In the following embodiment, four different conditions for building audio calls and/or video transmission between different electronic devices will be described. Firstly, the user A may dial the telephone number of the user B by the electronic device 100A. That is, an audio call between the electronic devices 100A and 200A is initiated, but video transmission between the electronic devices 100B and 200B has not been initiated yet. The electronic device 100A may report the dialing event to the server 100E upon dialing the telephone number of the user B, and the trigger management application executed by the server 100E may transmit a first video transmission request signal to the electronic device 100B. The user A may accept the video transmission request on the electronic device 100B, thereby building video transmission with the electronic device 200B of the user B. Similarly, upon transmitting the first video transmission request signal to the electronic device 100B, the server 100E may also transmit an audio call request signal to the electronic device 200A, and transmit a second video transmission request signal to the electronic device 200B. The user B may accept the audio call on the electronic device 200A, and accept the second video transmission request on the electronic device 200B. Specifically, the audio call between the electronic devices 100A and 200A can be performed on the telecommunications network 30, thereby obtaining excellent communication quality. Meanwhile, the video transmission between the electronic devices 100B and 200B can be performed on the IP network 40.

Secondly, the user A may dial the telephone number of the user B by the electronic device 100B. That is, video transmission between the electronic devices 100B and 200B is initiated, and an audio call between the electronic devices 100A and 200A has not been initiated yet. The electronic device 100B may report the dialing event to the server 100E upon dialing the telephone number of the user B, and the trigger management application executed by the server 100E may transmit a second audio call request signal to the electronic device 100A. The user A may accept the audio call request on the electronic device 100A, thereby building the audio call with the electronic device 200A of the user B. Similarly, upon transmitting the second audio call request signal to the electronic device 100A, the server 100E may further transmit a third audio call request signal to the electronic device 200A (and/or the electronic device 200B), and transmit a third video transmission request signal to the electronic device 200B. The user B may accept the audio call request on the electronic device 200A (e.g. via a virtual button display on the display unit 270 (e.g. a touch screen) or a physical button), and accept the third video transmission request on the electronic device 200B. In addition, the user B may accept the audio call request and the video transmission request on the electronic device 200B only. In other words, the user B may determine to perform the video call with the user A over the IP network 40 only. That is, audio/video signal packets of the electronic device 100B of the user A and the electronic device 200B of the user B can be only exchanged over the IP network 40.

Figure 4:
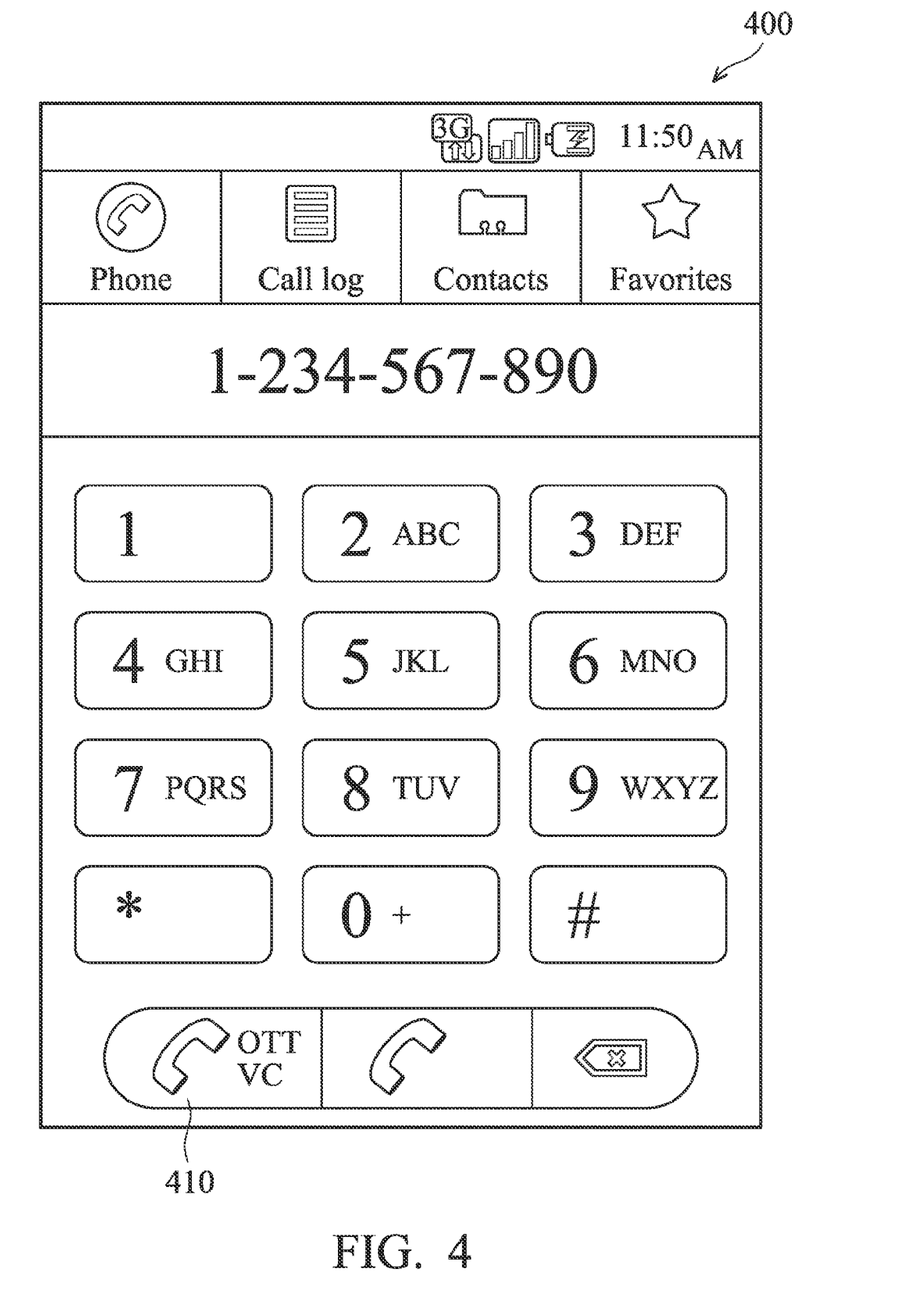
FIG. 4 is a diagram illustrating a dialing keyboard interface of the electronic device 100A according to an embodiment of the invention.

FIG. 4 is a diagram illustrating a dialing keyboard interface of the electronic device 100A according to an embodiment of the invention. Thirdly, if the users A and B have built an audio call by the electronic devices 100A and 200A on the telecommunications network 30, the user A may further select the "VIDEO CALL" button 410 on the dialing keyboard interface 400 displayed on the display unit 270, thereby building video transmission. Specifically, when the user A wants to build an extra video transmission channel in addition to the current audio call, the electronic device 100A may report the video transmission building event to the server 100E simultaneously. Meanwhile, the trigger management application executed by the server 100E may transmit a video transmission request signal to both the electronic devices 100B and 200B, and the users A and B may accept the video transmission request on the electronic devices 100B and 200B, respectively. Therefore, the video transmission between the electronic devices 100B and 200B can be built on the IP network 40.

Figure 5:
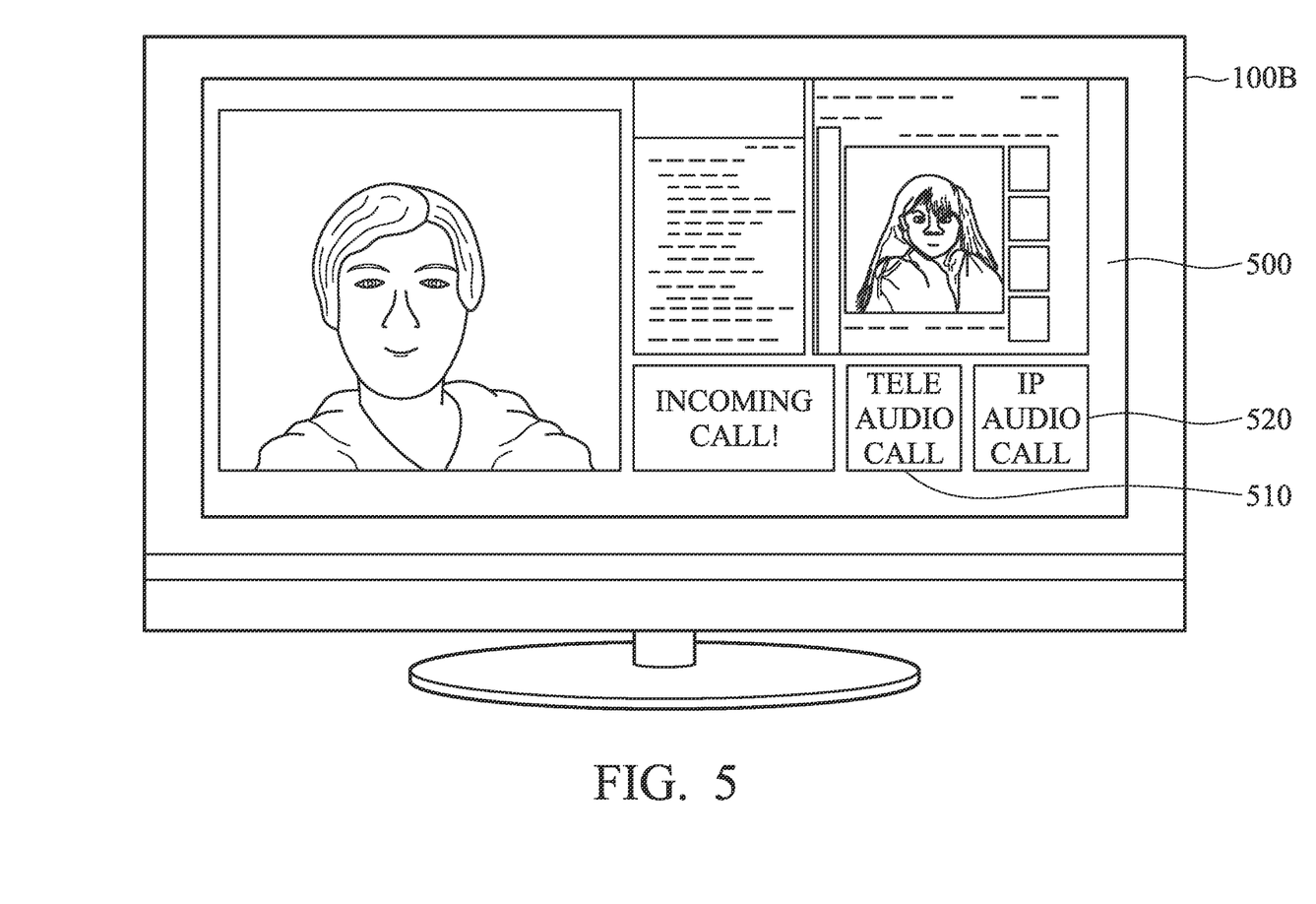
FIG. 5 is a diagram illustrating a user interface 500 of the electronic device 100B according to another embodiment of the invention.

FIG. 5 is a diagram illustrating a user interface 500 of the electronic device 100B according to another embodiment of the invention. Lastly (i.e. the fourth condition), if the users A and B have built a video call by the electronic devices 100B and 200B over the IP network 40 (i.e. audio/video signal packets are transmitted over the IP network 40, and the users A and B use the video network accounts Calvin1 and John1, respectively), the communication quality may be poor due to bad network conditions. The user A may select the "TELE AUDIO CALL" button 510 on the user interface 500 displayed on the display unit of the electronic device 100B, thereby building an audio transmission channel between the electronic devices 100A and 200A. The user A may also select the "IP AUDIO CALL" button 520 on the user interface 500 displayed on the display unit of the electronic device 100B, thereby the electronic devices 100A and 100B may rebuild a new audio transmission channel over the IP network 40 by releasing the original audio transmission channel over the telecommunications network 30. Specifically, when the user A wants to build an extra audio call channel in addition to the current video call, the electronic device 100A may report the audio call building event to the server 100E simultaneously. Meanwhile, the trigger management application executed by the server 100E may transmit an audio call request signal to the electronic device 100A. After the communication monitoring program 222 of the electronic device 100A has received the audio call request signal, the electronic device 100A may dial the telephone number 1234567890 of the user B automatically. In addition, the server 100E may also transmit a notification message to the electronic device 200B simultaneously, thereby informing the user B of the initialization of a corresponding audio call by the user A. Accordingly, the user B may accept the audio call request on the electronic device 200A, so that the audio call between the electronic devices 100A and 200A can be performed over the telecommunications network 30. It should be noted that once the audio call between the electronic devices 100A and 200A has been built over the telecommunications network 30, the communication monitoring programs of the electronic devices 100B and 200B may correspondingly mute the video call or turn off the microphones of the electronic devices 100B and 200B.

In another embodiment, the user A may activate both an audio call and video transmission simultaneously by using the electronic devices 100A and 100B. Specifically, the user A may set the condition that a video call be initiated by the electronic devices 100A and 100B simultaneously on the server 100E in advance. When the user A wants to initiate a video call with the user B (e.g. via the "OTT VC" button 410 (i.e. a "VIDEO CALL" button) on the dialing keyboard interface 400 in FIG. 4), the communication monitoring programs of the electronic devices 100A and 100B may report the initialization event to the server 100E simultaneously. Then, the server 100E may transmit an audio call request signal to the electronic device 200A, and transmit a video transmission request signal to the electronic device 200B. Meanwhile, the user B may accept the audio call request on the electronic device 200A, and accept the video transmission request on the electronic device 200B, thereby building the video call with the user A. Specifically, the user B may set the condition that different electronic devices of the user B may answer the incoming requests simultaneously to the communication monitoring program of the electronic devices 200A and 200B in advance. For example, when the user B accepts the audio call request from the electronic device 100A on the electronic device 200A, the communication monitoring program of the electronic device 200A may notify the communication monitoring program of the electronic device 200B to accept the video transmission request from the electronic device 100B of the user A correspondingly.

In an embodiment, the users A and B have built an audio call between the electronic devices 100A and 200A over the telecommunications network 30 and video transmission is open between the electronic devices 100B and 200B over the IP network 40. When one of the users A and B wants to hang up the video call from one of his electronic devices, there are several orders provided by the communication monitoring program to hang up the audio call and the video transmission. For example, the user A may hang up the audio call on the electronic device 100A first. When the communication monitoring program of the electronic device 100A has detected the hanging-up event, the electronic device 100A may notify the communication monitoring program of the electronic device 100B to stop the video transmission of the electronic device 100B after a predetermined time period. In addition, the user A may also stop the video transmission on the electronic device 100B first. After the communication monitoring program of the electronic device 100B has detected the stopping event, the electronic device 100B may notify the communication monitoring program of the electronic device 100A to hang up the audio call after a predetermined time period. In the two aforementioned embodiments, it is understood that the audio call and the video transmission can be stopped asynchronously. In addition, the user may also set the communication monitoring program to stop the audio call and the video transmission simultaneously. That is, when the user A hangs up the audio call on the electronic device 100A or stops the video transmission on the electronic device 100B, the electronic devices 100A and 100B may stop the corresponding audio call and video transmission simultaneously.

In the aforementioned embodiments, three initialization methods for the user A to trigger a video call by the electronic device 100A have been described, such as initiating an IP video call directly (i.e. one method) or non-directly (i.e. two methods). For example, in the direct method, the communication monitoring program 222 executed by the electronic device 100A may automatically monitor and determine whether the user A has send an audio call request to the telecommunications network 30, and transmit a request message for initiating an IP video call to the server 100E automatically. Meanwhile, the server 100E may perform the subsequent control operations, so that the electronic device 100B may transmit video packets to the electronic device 200B successfully.

There are two non-direct methods for initiating an IP video call, such as shaking the electronic device 100A or using the user interface. For example, the user A may initiate a video call by repeatedly shaking the electronic device 100A several times (e.g. 3 times) within a short time, or by selecting a corresponding button on the user interface of the electronic device 100A. When a video call has been built by the user shaking the electronic device 100A or selecting a corresponding button on the user interface, the communication monitoring program 222 may transmit a request message for initiating an IP video call to the server 100E upon initiating an audio call or after the audio call has been built. Then, the server 100E may perform subsequent control operations, so that the electronic device 100B may successfully transmit video packets to the electronic device 200B.

In addition, there are also three methods for initiating a video call after answering the audio call (i.e. over the telecommunications network) from the electronic device 100A, such as one direct method and two non-direct methods. For example, in the direct method, the electronic device 200A may also execute the communication monitoring program 222 correspondingly. The electronic device 200A may automatically transmit a request message for initiating an IP video call to the server 100E upon answering the audio call from the electronic device 100A. Then, the server 100E may perform subsequent control operations, thereby building the video call between the electronic devices 100B and 200B.

In the non-direct methods, an IP video call can be initiated by shaking the electronic device 200A or by selecting a corresponding button on the user interface. For example, the user B may activate an IP video call by shaking the electronic device 200A several times (e.g. 3 times) repeatedly in a short time, or by selecting the corresponding button on the user interface of the electronic device 200A. When the user B initiates an IP video call by shaking the electronic device 200A or by selecting the user interface displayed on the electronic device 200A, the communication monitoring program 222 of the electronic device 200A may transmit a request message for initiating an IP video call to the server 100E upon the ringing or answering of the audio call or after the audio call has been built. Then, the server 100E may perform subsequent control operations, so that the IP video call between the electronic devices 100B and 200B can be built. In addition, when the electronic device 200A receives the video call request from the electronic device 100A, the user B may operate the electronic device 200B to accept or reject the video call request. Also, the user B may ignore the video call request, and the communication monitoring program 222 of the electronic device 200A or 200B may reject the video call request automatically after a predetermined time period.

It should be noted that the users A and B may utilize their audio devices (e.g. the electronic devices 100A or 200A) to execute the communication monitoring program 222. The called party may answer the video call by using the aforementioned direct and non-direct methods, such as automatically answering the video call by the communication monitoring program 222, or answering the video call by shaking the electronic device within a predetermined time period. In addition, the called party of the video call may further select on the user interface displayed on his video device (e.g. the electronic devices 100B or 200B) to accept or reject the video call request. Further, the called party of the video call may ignore the video call request (e.g. the user B does not operate the electronic devices 200A or 200B). The communication monitoring program 222 may automatically terminate the video call request and corresponding operations after a predetermined time period (e.g. 10 or 15 seconds).

Figure 6:
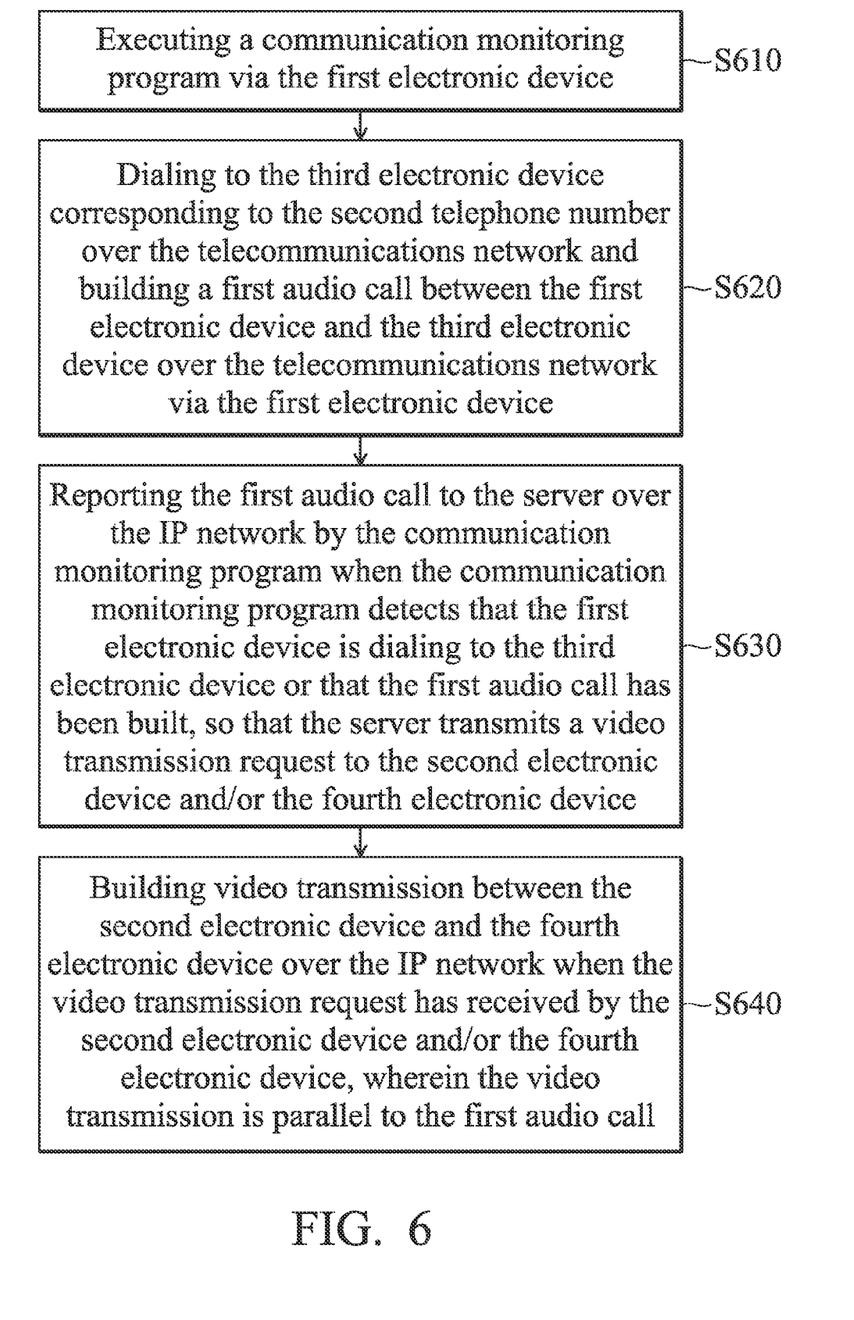
FIG. 6 is a flow chart illustrating a method for establishing a video conference according to an embodiment of the invention.

FIG. 6 is a flow chart illustrating a method for establishing a video conference according to an embodiment of the invention. Referring to both FIG. 1 and FIG. 6, the electronic devices 100A, 100B, 200A, 200B correspond to the first, second, third, and fourth electronic devices. In step S610, a communication monitoring program is executed by the first electronic device. In step S620, the first electronic device is utilized to dial a third electronic device corresponding to a second telephone number over the telecommunications network 30, and build a first audio call between the first electronic device and the third electronic device over the telecommunications network 30. In step S630, when the communication monitoring program 222 detects that the first electronic device is dialing the third electronic device to build the first audio call or that the first audio call has been built, the communication monitoring program 222 may report the first audio call to the server 100E over the IP network 40, so that the server 100E may transmit a video transmission request to the second electronic device and/or the fourth electronic device. In step S640, when the second electronic device and/or the fourth electronic device has received the video transmission request, a video transmission between the second electronic device and the fourth electronic device is built over the IP network 40, wherein the video transmission is parallel to the first audio call.

In view of the above, the video conferencing system of the invention may build a video communication over both the telecommunications network and the IP network (e.g. the Internet), and audio transmission of the video communication is built over the telecommunications network, and video transmission of the video communication is built over the IP network. Accordingly, the audio communication quality is excellent since the audio transmission is built over the telecommunications network. In addition, the video data can be transmitted over the IP network, and thus the cost for performing video communication can be reduced by the video conferencing system of the invention.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for establishing a video conference for use in a video conferencing system, wherein the video conferencing system comprises a first electronic device, a second electronic device, a third electronic device, a fourth electronic device, and a server, wherein the first electronic device corresponds to a first user and a first telephone number and is connected to a telecommunications network and an IP network, and the third electronic device corresponds to a second user and a second telephone number and is connected to the telecommunications network, and the second electronic device corresponds to the first user and a first video network account and is connected to the IP network, the fourth electronic device corresponds to the second user and a second video network account and is connected to the IP network, and the server is connected to the IP network, the method comprising:

(a) executing a communication monitoring program via the first electronic device;
(b) dialing the third electronic device corresponding to the second telephone number over the telecommunications network and building a first audio call between the first electronic device and the third electronic device over the telecommunications network via the first electronic device;
(c) reporting the first audio call to the server over the IP network by the communication monitoring program of the first electronic device, in response to the communication monitoring program detecting the first electronic device dialing the third electronic device, causing the server to transmit a video transmission request to the second electronic device and/or the fourth electronic device; and
(d) establishing video transmission between the second electronic device and the fourth electronic device over the IP network in response to receipt of the video transmission request by the second electronic device and/or the fourth electronic device, wherein the video transmission is parallel to the first audio call.

2. The method as claimed in claim 1, wherein the server comprises a communication database for storing the first video network account and the second video network account corresponding to the first telephone number and the second telephone number, respectively.

3. The method as claimed in claim 2, further comprising:
building a second audio call between the first electronic device and the third electronic device over the IP network.

4. The method as claimed in claim 2, wherein the video conferencing system further comprises a fifth electronic device corresponding to the first user and the first video network account, and the method further comprises:
transmitting the video transmission request to the fifth electronic device via the server; and
building video transmission between the fifth electronic device and the fourth electronic device over the IP network when the video transmission request has been received by the fifth electronic device.

5. The method as claimed in claim 1, wherein the video conferencing system further comprises a fifth electronic device corresponding to the first user and a third video network account of the first user, and the method further comprises:
binding the first video network account and the third video network account to the first telephone number;
transmitting the video transmission request to the second electronic device and the fifth electronic device via the server; and
building video transmission between the second electronic device, the fifth electronic device and the fourth electronic device over the IP network when the video transmission request has been received by the second electronic device or the fifth electronic device.

6. The method as claimed in claim 1, further comprising:
reporting a stopping event to the server via the communication monitoring program when the first user stops the first audio call on the first electronic device, so that the server notifies the second electronic device to stop the video transmission after a predetermined time period.

7. The method as claimed in claim 1, further comprising:
reporting a stopping event to the server via the communication monitoring program when the first user stops the video transmission on the second electronic device, so that the server notifies the first electronic device to hang up the first audio call after a predetermined time period.

8. The method as claimed in claim 1, further comprising:
reporting a stopping event to the server via the communication monitoring program when the second user stops the first audio call on the third electronic device, so that the server notifies the fourth electronic device to stop the video transmission after a predetermined time period.

9. The method as claimed in claim 1, further comprising:
reporting a stopping event to the server via the communication monitoring program when the second user stops the video transmission on the fourth electronic device, so that the server notifies the third electronic device to hang up the first audio call after a predetermined time period.

10. The method as claimed in claim 1, further comprising:
when the third electronic device transmit a connection command to the server over the IP network automatically after building the first audio call, transmitting the connection command to the fourth electronic device via the server, so that the video transmission of the second electronic device and the fourth electronic device is built; and
when the third electronic device cannot transmit the connection command to the server over the IP network automatically, determining whether the fourth electronic device accepts the video transmission according to a manual operation of the second user.

11. The method as claimed in claim1, further comprising:
reporting a stopping event to the server and keeping the first audio call via the communication monitoring program when the first user stops the first audio call on the first electronic device, so that the server notifies the first electronic device and the second electronic device to stop the first audio call and the video transmission, respectively.

12. The method as claimed in claim 1, wherein the step of reporting the first audio call to the server over the IP network via the communication monitoring program further comprises:
providing a user interface for the first user via the communication monitoring program, thereby reporting the first audio call to the server over the IP network upon the initiation of the first audio call or when the first audio call has been built.

13. The method as claimed in claim 1, wherein the first electronic device further comprises a motion detection device configured to detect the motion of the first electronic device, and the step of reporting the first audio call to the server over the IP network via the communication monitoring program further comprises:
receiving the motion information of the first electronic device via the communication monitoring program to determine whether the first user repeatedly shakes the first electronic device several times within a predetermined time period; and
when the first user repeatedly shakes the first electronic device several times within the predetermined time period, reporting the first audio call to the server over the IP network via the communication monitoring program upon the initiation of the first audio call or when the first audio call has been built.

14. The method as claimed in claim 1, wherein the communication monitoring program further detects communication activities of the first electronic device, and when the communication monitoring program detects that the first electronic device dials the third electronic device over the telecommunications network, the communication monitoring program further reports the first audio call to the server over the IP network.

15. a method for establishing a video conference for use in a video conferencing system, wherein the video conferencing system comprises a first electronic device, a second electronic device, a third electronic device, a fourth electronic device, and a server, wherein the first electronic device corresponds to a first user and a first telephone number and is connected to a telecommunications network and an IP network, and the third electronic device corresponds to a second user and a second telephone number and is connected to the telecommunications network, and the second electronic device corresponds to the first user and a first video network account and is connected to the IP network, the fourth electronic device corresponds to the second user and a second video network account and is connected to the IP network, and the server is connected to the IP network, the method comprising:
   (a) executing a communication monitoring program via the third electronic device;
   (b) reporting an audio call to the server over the IP network via the communication monitoring program in response to the second user using the third electronic device to answer an audio call request, to establish the audio call from the first electronic device, causing the server to transmit a video transmission request to the second electronic device and the fourth electronic device; and
   (c) establishing video transmission between the second electronic device and the fourth electronic device over the IP network in response to receipt of the video transmission request by the second electronic device and/or the fourth electronic device, wherein the video transmission is parallel to the audio call.

16. The method as claimed in claim 15, wherein the communication monitoring program reports the audio call to the server upon the ringing of the audio call on the third electronic device, upon accepting the audio call, or when the audio call has been built.

17. The method as claimed in claim 16, wherein the step of reporting the audio call to the server over the IP network via the communication monitoring program further comprises:
   providing a user interface for the second user via the communication monitoring program to report the audio call to the server over the IP network.

18. The method as claimed in claim 16, wherein the third electronic device further comprises a motion detection device for detecting the motion of the third electronic device, and the step of reporting the audio call to the server over the IP network further comprises:
   receiving the motion information of the third electronic device via the communication monitoring program to determine whether the second user repeatedly shakes the third electronic device several times within a predetermined time period; and
   reporting the audio call to the server over the IP network via the communication monitoring program when the second user shakes the third electronic device several times within the predetermined time period.

19. The method as claimed in claim 15, wherein the communication monitoring program further detects communication activities of the third electronic device, and when the communication monitoring program detects that the third electronic device accepts the audio call, the communication monitoring program further reports the audio call to the server over the IP network automatically.

20. A method for establishing a video conference for use in a video conferencing system, wherein the video conferencing system comprises a first electronic device, a second electronic device, a third electronic device, a fourth electronic device, and a server, wherein the first electronic device corresponds to a first user and a first telephone number and is connected to a telecommunications network and an IP network, and the third electronic device corresponds to a second user and a second telephone number and is connected to the telecommunications network, and the second electronic device corresponds to the first user and a first video network account and is connected to the IP network, the fourth electronic device corresponds to the second user and a second video network account and is connected to the IP network, and the server is connected to the IP network, the method comprising:
   (a) executing a communication monitoring program via the third electronic device, wherein the third electronic device further comprises a motion detection device for detecting the motion of the third electronic device; and
   (b) when the first user utilizes the first electronic device and/or the second electronic device to transmit a video transmission request to the third electronic device and/or the fourth electronic device over the IP network, answering the video transmission request by using the communication monitoring program executed by the third electronic device of the second user, wherein the step of answering the video transmission request via the communication monitoring program executed by the third electronic device of the second user further comprises:
   receiving the motion information via the communication monitoring program to determine whether the second user repeatedly shakes the third electronic device several times within a predetermined time period; and
   when the third electronic device has been repeatedly shaken several times within the predetermined time period, accepting the video transmission request via the communication monitoring program.

21. The method as claimed in claim 20, wherein the step of answering the video transmission request by using the communication monitoring program executed by the third electronic device of the second user further comprises:
   providing a user interface for the second user via the communication monitoring program, thereby accepting or rejecting the video transmission request over the IP network.

22. The method as claimed in claim 20, further comprising:
   utilizing the fourth electronic device to accept or reject the video transmission request.

23. The method as claimed in claim 20, further comprising:
   when the second user does not answer the video transmission request on the second electronic device or the fourth electronic device within a predetermined time period, utilizing the communication monitoring program to reject the video transmission request automatically.

24. a method for establishing a video conference for use in a video conferencing system, wherein the video conferencing system comprises a first electronic device, a second electronic device, a third electronic device, a fourth electronic device, and a server, wherein the first electronic device corresponds to a first user and a first telephone number and is connected to a telecommunications network and an IP network, and the third electronic device corresponds to a second user and a second telephone number and is connected to the telecommunications network, and the second electronic device corresponds to the first user and a first video network account and is connected to the IP network, the fourth electronic device corresponds to the second user and a second video network account and is connected to the IP network, and the server is connected to the IP network, the method comprising:
- (a) executing a communication monitoring program via the first electronic device;
- (b) establishing a video call between the second electronic device and the fourth electronic device over the IP network;
- (c) in response to the first user utilizing a user interface of the second electronic device to initiate an audio call, reporting the initiation event to the server over the IP network via the communication monitoring program, causing the server to transmit an audio call request to the first electronic device, causing the first electronic device to dial the third electronic device corresponding to the second telephone number; and
- (d) establishing the audio call between the first electronic device and the third electronic device over the telecommunications network in response to the dialing event from the first electronic device being received by the third electronic device, wherein the audio call is parallel to the video call.

* * * * *